(12) United States Patent
Zhou et al.

(10) Patent No.: US 11,360,854 B2
(45) Date of Patent: Jun. 14, 2022

(54) STORAGE CLUSTER CONFIGURATION CHANGE METHOD, STORAGE CLUSTER, AND COMPUTER SYSTEM

(71) Applicant: HUAWEI TECHNOLOGIES CO., LTD., Shenzhen (CN)

(72) Inventors: Siyi Zhou, Shenzhen (CN); Feng Liang, Shenzhen (CN); Yanan Zhi, Shenzhen (CN); Xihua Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 16/862,591

(22) Filed: Apr. 30, 2020

(65) Prior Publication Data

US 2020/0257593 A1 Aug. 13, 2020

Related U.S. Application Data

(63) Continuation of application No. PCT/CN2018/112580, filed on Oct. 30, 2018.

(30) Foreign Application Priority Data

Oct. 31, 2017 (CN) .......................... 201711054330.9

(51) Int. Cl.
*G06F 11/00* (2006.01)
*G06F 11/14* (2006.01)
(Continued)

(52) U.S. Cl.
CPC ........ *G06F 11/142* (2013.01); *G06F 11/1425* (2013.01); *G06F 11/2092* (2013.01);
(Continued)

(58) Field of Classification Search
CPC .............. G06F 11/142; G06F 11/1425; G06F 11/2092; H04L 45/02; H04L 45/12; H04L 67/1044; H04L 67/1048; H04L 67/1051
See application file for complete search history.

(56) References Cited

U.S. PATENT DOCUMENTS 11,210,187 B1 * 12/2021 Gusev ................. G06F 11/1425
2012/0290691 A1 * 11/2012 Buendgen ............ G06F 9/5061
709/220
(Continued)

FOREIGN PATENT DOCUMENTS

CN 104283906 A 1/2015
CN 105159818 A 12/2015
(Continued)

OTHER PUBLICATIONS

Diego Ongaro et al: "In Search of an Understandable Consensus Algorithm (Extended Version)", May 20, 2014 (May 20, 2014), XP055468579, total 18 pages.
(Continued)

*Primary Examiner* — Marc Duncan
(74) *Attorney, Agent, or Firm* — Rimon PC

(57) ABSTRACT

Various embodiments provide a storage cluster configuration change method, an apparatus, a computer system, and the like. In a storage cluster that uses a consensus replication protocol, when half of storage nodes become faulty, if it is determined that at least one storage node exists in the storage cluster after the fault, and a latest log index number of the storage node is greater than or equal to an index number of a committed log provided by the storage cluster for a client, an arbitration module sends a forced cluster configuration change instruction to a fault-free storage node. The forced
(Continued)

cluster configuration change instruction is used to instruct the fault-free storage node to change local cluster configuration information.

20 Claims, 10 Drawing Sheets

(51) Int. Cl.
*G06F 16/18* (2019.01)
*G06F 16/901* (2019.01)
*G06F 11/20* (2006.01)
*H04L 45/02* (2022.01)
*H04L 45/12* (2022.01)

(52) U.S. Cl.
CPC ...... *G06F 16/1815* (2019.01); *G06F 16/9024* (2019.01); *H04L 45/02* (2013.01); *H04L 45/12* (2013.01)

(56) References Cited

U.S. PATENT DOCUMENTS

| | | |
|---|---|---|
| 2015/0278039 A1 | 10/2015 | Bogdanov et al. |
| 2016/0077936 A1 | 3/2016 | Tang et al. |
| 2016/0210205 A1 | 7/2016 | McAlister et al. |
| 2017/0032010 A1* | 2/2017 | Merriman ............... G06F 16/21 |
| 2017/0286280 A1 | 10/2017 | Algie et al. |
| 2018/0367610 A1 | 12/2018 | Wang |
| 2019/0058762 A1* | 2/2019 | Guru ..................... G06F 9/4856 |
| 2019/0342149 A1 | 11/2019 | Guo et al. |

FOREIGN PATENT DOCUMENTS

| | | |
|---|---|---|
| CN | 105426439 A | 3/2016 |
| CN | 105915369 A | 8/2016 |
| CN | 106407042 A | 2/2017 |
| CN | 106878382 A | 6/2017 |
| CN | 106953901 A | 7/2017 |
| CN | 107105032 A | 8/2017 |
| CN | 107124305 A | 9/2017 |
| CN | 107295080 A | 10/2017 |

OTHER PUBLICATIONS

Heidi Howard et al: "Raft Refloated: Do We Have Consensus?", Operating Systems Review, ACM, New York, NY, US, vol. 49, No. 1, Jan. 20, 2015 (Jan. 20, 2015), pp. 12-21, XP058066108.

* cited by examiner

STORAGE CLUSTER CONFIGURATION CHANGE METHOD, STORAGE CLUSTER, AND COMPUTER SYSTEM

CROSS-REFERENCE TO RELATED APPLICATIONS

This application is a continuation of International Application No. PCT/CN2018/112580, filed on Oct. 30, 2018, which claims priority to Chinese Patent Application No. 201711054330.9, filed on Oct. 31, 2017. The disclosures of the aforementioned applications are hereby incorporated by reference in their entireties.

TECHNICAL FIELD

This application relates to distributed storage cluster technologies, and in particular, to a technology for changing a cluster configuration after a fault occurs in a storage cluster.

BACKGROUND

A plurality of distributed storage nodes are deployed in a storage cluster. The plurality of storage nodes may use a consensus replication protocol, such as the Raft protocol, to ensure data consistency.

The Raft protocol is a common consensus replication protocol, and specifies that the storage cluster can continue to provide a data replication service (or referred to as a data write service) only after latest data is stored in most (more than half of) storage nodes. In other words, each time data is updated, the storage cluster can continue to provide the data replication service only after a storage leader in the Raft protocol obtains a response that most nodes (including the storage leader) have stored the latest data. After a specific quantity of storage nodes become faulty, the Raft protocol requires a cluster configuration change, so that the latest data is stored in most nodes under a new cluster configuration. The storage cluster can continue to provide the data replication service only on this premise. In the Raft protocol, a process of changing a cluster configuration actually is also a data replication process. However, replicated data (or referred to as a log) is a configuration change command used to change a cluster configuration. Therefore, during the cluster configuration change, the specification "latest data is stored in most storage nodes" needs to be satisfied.

In the existing Raft protocol, after less than half of the storage nodes become faulty, a configuration change command sent by the storage leader can be responded to by most fault-free storage nodes, and therefore the storage cluster can continue to provide the data replication service. Specifically, after less than half of the storage nodes become faulty, the storage leader sends the configuration change command to all remaining fault-free storage nodes. The command is stored by all the fault-free storage nodes and a response is returned to the storage leader (returning the response indicates that the command is successfully stored). Because a quantity of the fault-free storage nodes exceeds half of the storage nodes and a requirement of the Raft protocol is satisfied, the storage leader instructs all the fault-free storage nodes to respectively change their cluster configuration information, so that the storage cluster continues to provide the data replication service under the new cluster configuration. When the storage leader also becomes faulty, the Raft protocol requires that a process of re-electing a storage leader should be first performed. Then a new storage leader performs the foregoing process of changing a cluster configuration.

However, when half of the storage nodes become faulty at the same time, in the existing Raft protocol, responses of most storage nodes to the configuration change command cannot be obtained. Therefore, the requirement of the Raft protocol cannot be satisfied, and a decision on cluster configuration change cannot be reached. As a result, the storage cluster cannot complete the cluster configuration change. In this way, even if data that satisfies a user requirement is actually still stored in the storage cluster, the storage cluster cannot continue to provide the data replication service.

FIG. 1 is an example of a storage cluster. The storage cluster includes two available zones (AZ). An AZ includes a plurality of data centers. Each AZ has an independent power supply, an independent network, and the like. If a common fault, such as a power fault, a network fault, a software deployment fault, a flood, or another disaster, occurs in an AZ, another AZ is usually not affected. AZs are connected by using a low-latency network. Two storage nodes are deployed in each of an AZ 1 and an AZ 2 (at a storage layer), that is, symmetrically deployed. If two AZs are symmetrically deployed, it means that same quantities of storage nodes are respectively deployed in the two AZs. Two computing nodes are deployed in each of the two AZs (at a computing layer). The computing nodes may include, for example, a structured query language (structured query language, SQL) reader/writer node and an SQL reader-only node. The storage nodes include one storage leader and three storage followers. According to the specification of the Raft protocol, three or more of four storage nodes are required to store latest data. It is assumed that a storage leader L and storage followers F1 and F2 in FIG. 1 have stored the latest data. As shown in FIG. 1, after the AZ 1 becomes faulty (or any two other storage nodes become faulty), because half of the four storage nodes, namely, two storage nodes have become faulty, responses of a maximum of only two storage nodes in the AZ 2 can be obtained even if a configuration change command is sent. The requirement that most storage nodes respond cannot be satisfied. Therefore, a cluster configuration change fails. Even if the storage follower F2 that has stored the latest data still exists, the storage cluster cannot continue to provide the data replication service.

It can be learned from the foregoing analysis and example that, in a storage cluster that uses a consensus replication protocol such as Raft, a technical solution is in urgent need, so that the technical solution can ensure that the storage cluster can continue to provide a consistent data replication service under a particular condition after half of the storage nodes become faulty.

SUMMARY

For ease of understanding of the technical solutions provided herein, some elements in descriptions of this application are first described herein.

Node: A node is a computer with an independent operating system and may be a virtual machine such as an ordinary virtual machine or a lightweight virtual machine, or may be a physical computer.

Persistent storage: After a computer is powered off or restarted, stored information is not lost. For example, persistent storage includes file storage and database storage.

Most: "Most", represented by M, of a set with a size of N is a quantity of more than half of the size of the set, that is,

|N/2|+1≤M≤N, where M and N are both positive integers, and || represents rounding down.

Half (or half of): Half, represented by M, of a set with a size of N is M=N/2. Note that N/2 is not rounded herein. In this application, when a quantity of nodes before a fault occurs in the storage cluster is an odd number N, half, represented by M, of the quantity of nodes is not an integer, but a quantity of faulty nodes must be an integer. Therefore, a requirement of "half" cannot be satisfied.

Log: A log represents any operating command of any one of a database data operation, a file operation, or a status operation, or the like, for example, a data read command, a data write command, or a configuration change command. An order of logs is maintained by using incremental index numbers. For a database operation, logs are executed in an order of index numbers of the logs and actual data content can be constructed. "Committed" (committed) is a response of the storage cluster to successful storage of the logs (or referred to as commands) into most storage nodes. A "committed log" is a log that has been successfully stored in most storage nodes. No storage node executes an uncommitted log.

As described herein, "information used to indicate A" means that information about A can be obtained. A manner of obtaining A may be: obtaining the information, where the information may be A, or the information may be used to obtain A. "A/B" or "A and/or B" in this application includes three possible cases: A, B, and both A and B.

Embodiments can provide a storage cluster configuration change method, a corresponding apparatus, and a storage cluster. The method is applied to a storage cluster that uses a consensus replication protocol. In such a storage cluster, after half of storage nodes become faulty, the storage cluster definitely cannot continue to provide a data replication service. However, the method provided in this application can still ensure that the storage cluster continues to provide the data replication service under a particular condition when half of the storage nodes become faulty, thereby improving availability of the storage cluster.

The following describes a plurality of aspects of the summary provided herein. It should be understood that the following plurality of aspects of the summary is not all content provided in this application, and mutual reference may be made to implementations and beneficial effects thereof.

According to a first aspect, embodiments can provide a storage cluster. The storage cluster includes a plurality of storage nodes: one storage leader and a plurality of storage followers. A consensus replication protocol such as Raft is used between the storage nodes in the storage cluster to maintain consistency. Further, the storage cluster includes an arbitration module and a configuration library. The configuration library is configured to store configuration data of the storage cluster. The configuration data includes cluster configuration information. The cluster configuration information includes information about all fault-free storage nodes in the storage cluster, such as a storage node ID. The arbitration module is configured to: after a fault occurs in the storage cluster, change the cluster configuration information stored in the configuration library and send a forced cluster configuration change instruction to a fault-free storage node if the following conditions A and B are satisfied, where the forced cluster configuration change instruction is used to instruct the fault-free storage node to change local cluster configuration information: condition A: a quantity of faulty storage nodes is half of a quantity of all storage nodes in the storage cluster before the fault occurs; and condition B: at least one storage node exists in the storage cluster after the fault, and a latest log index number of the storage node is greater than or equal to an index number of a committed log provided by the storage cluster for a client. The index number represents a capability of a data replication service and is service quality promised by the storage cluster to a client.

The fault herein usually means a fault that a storage node is unavailable, or another fault that affects cluster configuration.

"Local" of the storage node usually means a memory such as an internal memory and/or a disk inside the storage node. When the storage node is a physical computer, "local" usually means a memory such as an internal memory and/or a disk on the physical computer. When the storage node is a virtual machine or another type of virtualization device, "local" usually means a memory, such as an internal memory and/or a disk, that is located inside a physical host machine and that can be accessed by the virtual machine.

Whether condition A is satisfied can be determined not necessarily by obtaining the two values: the quantity of the faulty storage nodes and the quantity of all the storage nodes in the storage cluster before the fault occurs. In some embodiments, whether condition A is satisfied can be determined based on an actual situation in some simple manners. For example, in a storage cluster with two AZs and with storage nodes symmetrically deployed in the two AZs, after an AZ-level fault occurs, it can be directly determined that half of the nodes become faulty. Likewise, same determining also applies to condition B. There are a plurality of specific implementations of determining whether the condition is satisfied, and this is not limited in this application.

The arbitration module may be deployed in a storage node, or may be deployed in another location. Same deployment also applies to the configuration library. This is not limited in this application.

It can be learned that, it is first determined that half of the storage nodes become faulty, and then it is determined that the storage cluster after the fault can still ensure service quality. Then, a forced cluster configuration change is performed, so that the storage cluster continues to provide a service, and availability of the storage cluster is improved while service quality is ensured.

Based on the first aspect, in some implementations, the arbitration module is further configured to: after the fault occurs in the storage cluster and a forced cluster configuration change is performed, re-elect a candidate storage leader from the fault-free storage nodes, and send a leader election request to the candidate storage leader. The leader election request is used to instruct the candidate storage leader to initiate a leader election process in compliance with the consensus replication protocol.

After a configuration of the storage cluster changes, the storage leader may be re-elected based on a status and a requirement of the existing configuration of the storage cluster, to improve performance of the storage cluster under a new configuration.

Based on the first aspect, in some implementations, the arbitration module is configured to: elect a storage node whose latest log index number is the largest in all the fault-free storage nodes as the candidate storage leader.

Based on the first aspect, in some implementations, the configuration data further includes network topology information of a network on which the storage cluster is deployed. The arbitration module is configured to: obtain the network topology information and construct a directed weighted graph from a client node or an agent node to each of the fault-free storage nodes based on the network topology information, where a weight of an edge between nodes is determined by a network communication rate or load between the nodes (or a rate and load); and calculate a shortest path in the directed weighted graph, and determine that a storage node on the shortest path is the candidate storage leader.

The network communication rate or the load between the nodes may be stored in a node in which the arbitration module is deployed, or may be stored in another node and obtained by the arbitration module. A manner of obtaining the communication rate or the load is not limited in this application.

The network topology information mainly includes information used to indicate which AZ and/or which computer each storage (or SQL) node is located in. The network topology information and the configuration information may be indicated by using separate data, or may be identified by using combined data. For example, if the configuration data includes a plurality of pieces of such information as "a cluster ID, an AZ ID, a computer name, and an ID of a (fault-free) storage node (or SQL node)", both the configuration information and the network topology information are indicated.

There are a plurality of manners of re-electing the storage leader. The storage leader may be re-elected based on a factor such as a log index number or network access performance, or may be re-elected in combination with a plurality of factors, to improve performance of the storage cluster under the new configuration. The foregoing is merely two examples.

Based on the first aspect, in some implementations, a re-elected storage leader is configured to: send a write request for a cluster configuration change log to a current storage follower (a fault-free storage follower) in the storage cluster. The cluster configuration change log includes information about a faulty storage node in the cluster configuration change. The "re-elected storage leader" herein is a new storage leader elected, by the storage cluster after the fault occurs, based on the leader election request and the consensus replication protocol mentioned in the foregoing embodiments. Another fault-free storage node is the storage follower.

The log that records the cluster configuration change is stored in the storage cluster. The storage cluster can be restored based on the log during subsequent restoration of the storage cluster. This step is optional if the subsequent restoration of the storage cluster is not considered.

In some other implementations, the write request for the cluster configuration change log may be sent by the arbitration module to all the fault-free storage nodes, to instruct all the fault-free storage nodes to locally store the cluster configuration change log. Based on the first aspect, in some implementations, the arbitration module is configured to: obtain latest log index numbers of all the fault-free storage nodes after the fault, and determine that condition B is satisfied if a largest value of the latest log index numbers of all the fault-free storage nodes after the fault is greater than or equal to a largest value of latest log index numbers of all the fault-free storage nodes after the previous fault; and/or the arbitration module is configured to: determine that condition B is satisfied if the fault is the first fault of the cluster.

Based on the first aspect, in some implementations, the configuration library is a distributed configuration library, and is deployed in the plurality of storage nodes and another node in a distributed manner.

According to a second aspect, various embodiments provide a storage cluster configuration change method. The method may be applied to a storage cluster that uses a consensus replication protocol. The storage cluster includes a plurality of storage nodes and a configuration library. The method includes:

after a fault occurs in the storage cluster, changing cluster configuration information stored in the configuration library and sending a forced cluster configuration change instruction to a fault-free storage node if the following conditions A and B are satisfied, where the forced cluster configuration change instruction is used to instruct the fault-free storage node to change local cluster configuration information: condition A: a quantity of faulty storage nodes is half of a quantity of all storage nodes in the storage cluster before the fault occurs; and condition B: at least one storage node exists in the storage cluster after the fault, and a latest log index number of the storage node is greater than or equal to an index number of a committed log provided by the storage cluster for a client. The configuration library stores configuration data of the storage cluster, the configuration data includes the cluster configuration information, and the cluster configuration information includes information about all fault-free storage nodes in the storage cluster.

In some implementations, the method may be implemented by an arbitration module. The arbitration module may be deployed in the storage node, or may be deployed in a node of another type, or may be independently deployed as an independent node.

In some implementations, the foregoing configuration library may be a distributed configuration library, and is deployed in the plurality of storage nodes in a distributed manner. Further, the configuration library may be alternatively deployed in a lightweight node that is independent of the storage node.

In some implementations, after a configuration of the cluster changes, the storage cluster may elect a new storage leader. Further, after the new storage leader is elected, the arbitration module or the new storage leader may send a write request for a cluster configuration change log to another storage node. The write request includes the cluster configuration change log. The log is used to record related information of the cluster configuration change for a subsequent operation such as cluster restoration. For a specific implementation thereof, refer to the first aspect.

According to a third aspect, this application provides an apparatus for changing a configuration of a storage cluster. The apparatus includes one or more modules. The module or the modules are configured to implement any one of the methods according to the foregoing aspects.

According to a fourth aspect, this application provides a computer readable storage medium. The computer readable storage medium includes a computer readable instruction. When the computer readable instruction is read and executed by a processor, the method according to any one of embodiments of this application is implemented.

According to a fifth aspect, this application provides a computer program product. The computer program product includes a computer readable instruction. When the computer readable instruction is read and executed by a processor, the method according to any one of embodiments of this application is implemented.

According to a sixth aspect, this application provides a computer system, including a processor and a memory. The memory is configured to store a computer instruction. The processor is configured to read the computer instruction and implement the method according to any one of embodiments of this application.

BRIEF DESCRIPTION OF DRAWINGS

To describe the technical solutions provided in this application more clearly, the following briefly describes the accompanying drawings. Apparently, the accompanying drawings in the following description show merely some embodiments of this application.

DESCRIPTION OF EMBODIMENTS

Figure 1:
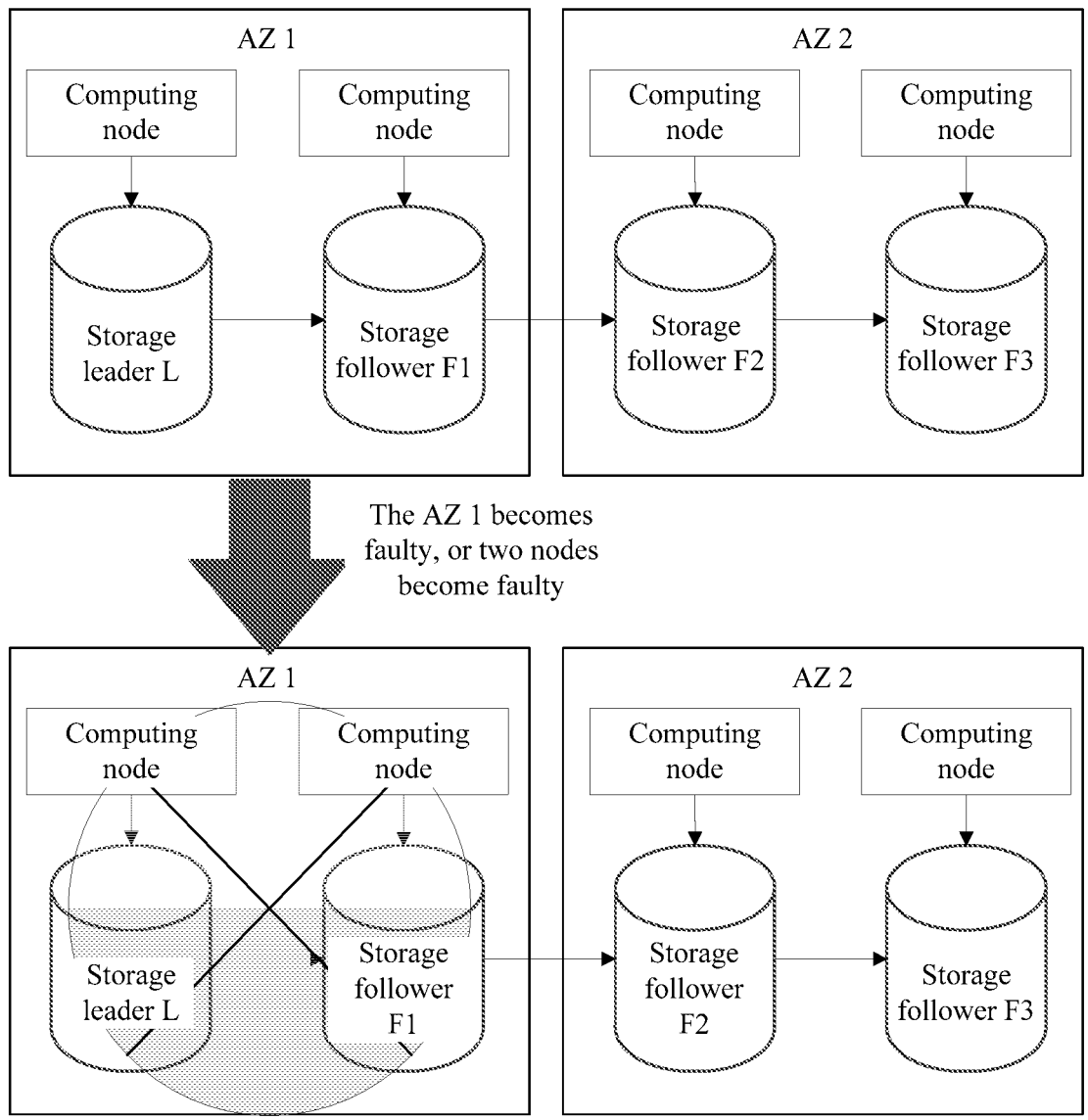
FIG. 1 is a schematic diagram of a storage cluster when a fault occurs.
Figure 2:
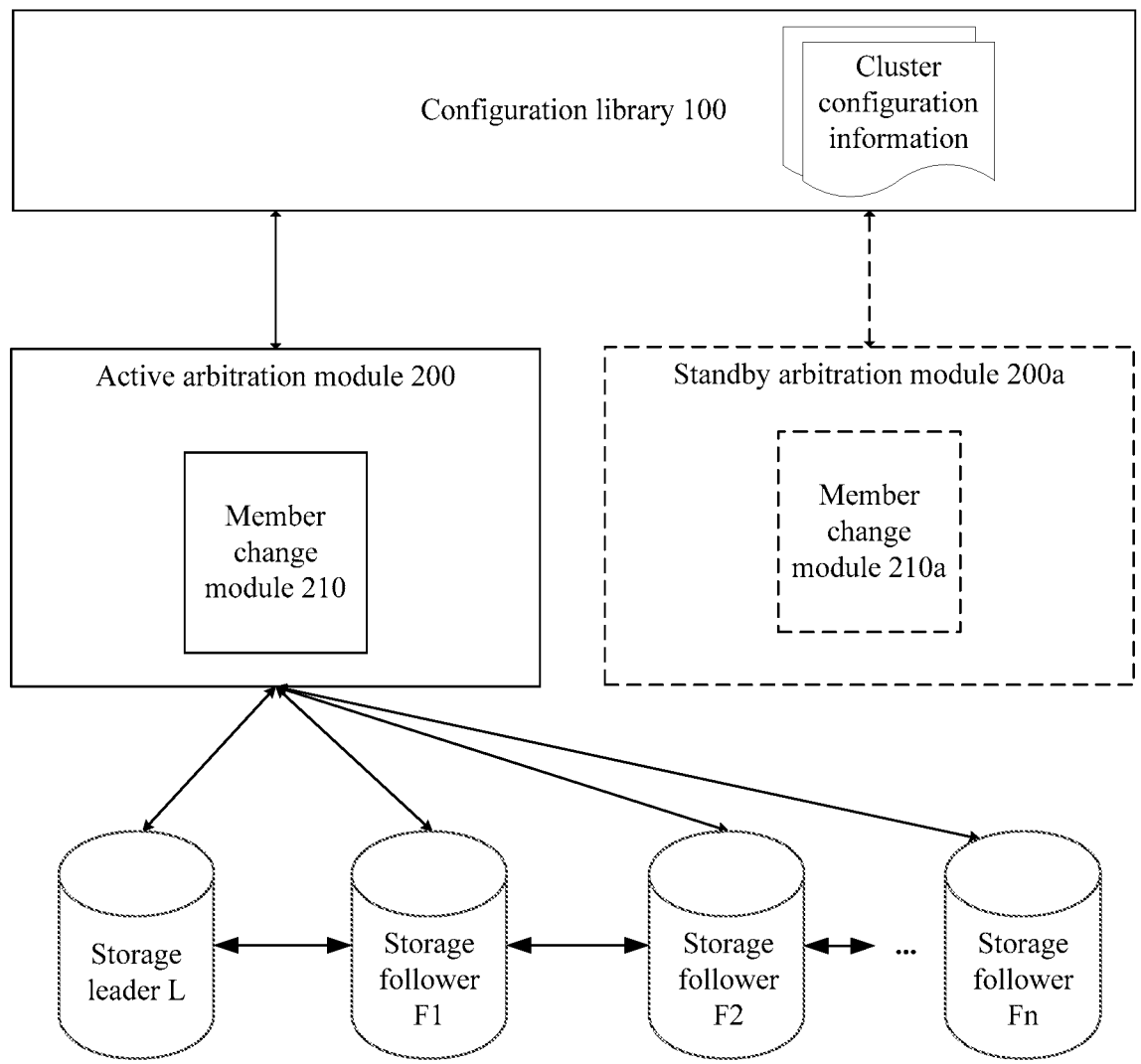
FIG. 2 is a schematic diagram of a logical structure of a storage cluster.

FIG. 2 is a schematic diagram of a storage cluster according to one embodiment. The figure shows an example of four storage nodes in the storage cluster, which include one storage leader L and three storage followers F1 to F3. Each storage node includes a storage module, configured to provide a service related to data storage. In addition, the storage cluster further includes a configuration library 100 and an arbitration module (not shown in the FIG. 1). Further, the arbitration module may include an active arbitration module 200 and one or more standby arbitration modules 200a. The standby arbitration module 200a does not run when the active arbitration module 200 is available.

The storage leader L and the storage followers F1 to Fn are nodes in the storage cluster that uses a consensus protocol (for example, Raft). The consensus protocol is used between a plurality of storage nodes to maintain a plurality of replicas of same data (briefly referred to as data replicas below).

The configuration library 100 is a configuration library that can normally provide read and storage services of cluster configuration information when the storage node becomes faulty. The configuration library 100 stores configuration data of the storage cluster. The configuration data includes the cluster configuration information. The cluster configuration information may include an ID of each storage node in the storage cluster, and may further include mapping between the ID of each storage node and progress of data that has been synchronized by the storage node.

Further, the configuration data may further include status information, network topology information, and the like in a configuration change process. A plurality of storage clusters may share a same configuration library. The configuration library 100 may specifically be a distributed configuration library. The configuration library may be deployed in one or more nodes. Some or all of the one or more nodes may be storage nodes.

The arbitration modules (e.g., 200 and 200a) can assume a stateless arbitration role. When a storage node becomes faulty, a member change module (210 or 210a) in the arbitration module (200 or 200a) can complete a configuration change process of the storage cluster. "Stateless" means that the arbitration module does not persistently store the cluster configuration information, and does not persistently store status information, network topology information, or the like (all the information is persistently stored in the configuration library 100) in the configuration change process. The arbitration module (200 and 200a) receives an external input instruction (or information), and accesses the configuration library, obtain required information, and make an arbitral decision based on programming logic, or may coordinate another node to make the arbitral decision. Usually only one active arbitration module 200 works. After the active arbitration module 200 becomes faulty, the standby arbitration modules 200a can take over work of the active arbitration module 200, where an active/standby switchover is related. However, because of the stateless feature, the active/standby switchover is fast and convenient. The arbitration module may be deployed in an independent arbitration node or may be deployed in a storage node.

Figure 3:
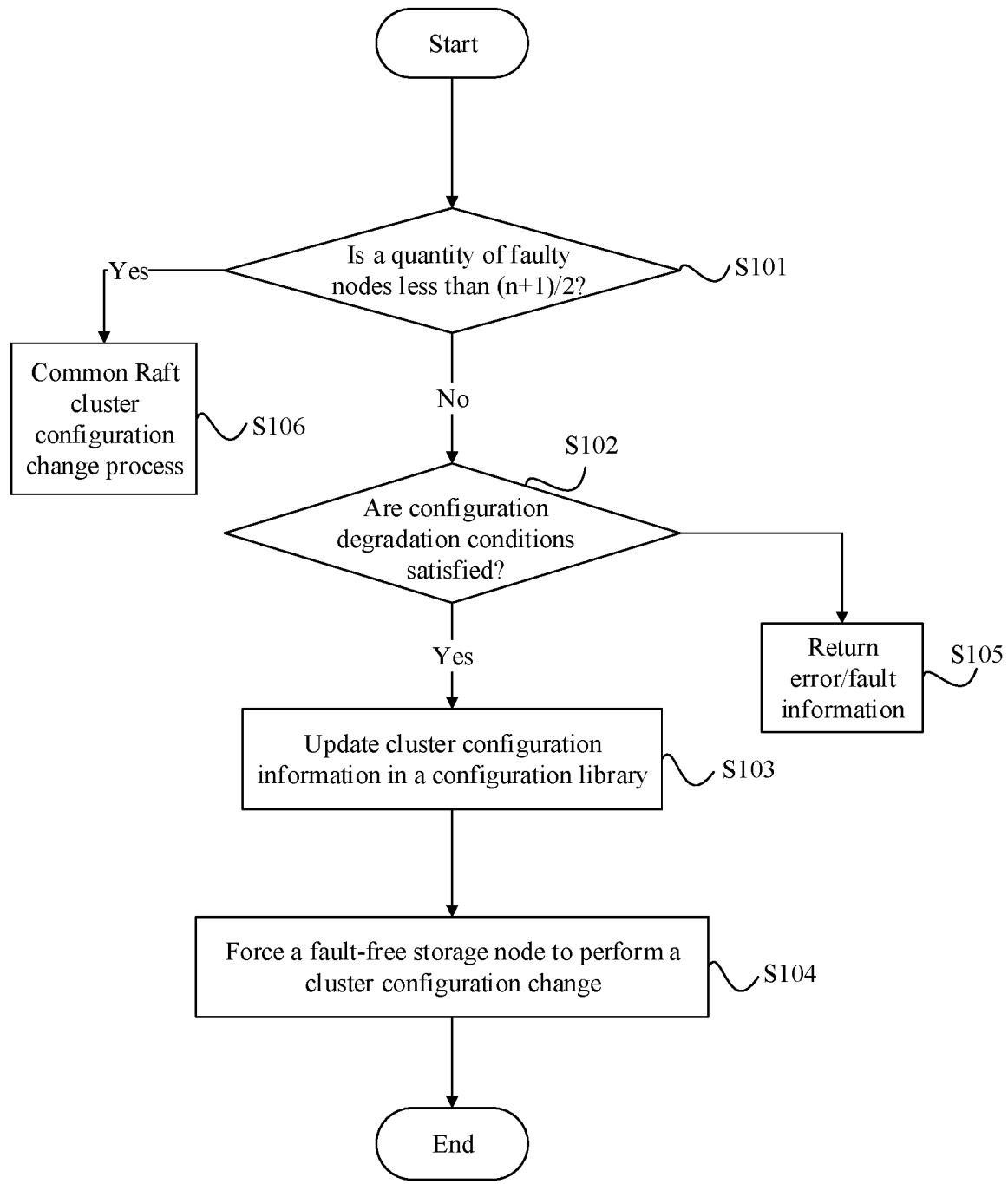
FIG. 3 is a schematic flowchart of a cluster configuration change method.

FIG. 3 is a schematic flowchart of a storage cluster configuration change method according to an embodiment. The method is performed by the member change module 210 when the active arbitration module 200 is not faulty. After receiving fault information or a configuration change instruction, the member change module 210 determines whether a quantity of faulty storage nodes is less than half of a quantity of storage nodes before a fault, namely, (n+1)/2 (S101); if yes, perform a consensus cluster configuration change process in the prior art (S106); or if no, determine whether configuration degradation conditions (S102) are satisfied (S102). For details about the consensus cluster configuration change process, refer to the background. A process of re-electing a storage leader may be related.

In some implementations, the fault information may be input into the configuration library 100 from outside (for example, a cluster monitoring apparatus or an administrator). The active arbitration module 200 monitors the fault information (for example, an ID of a faulty node or an ID of a node that survives a fault). In some embodiments, a cluster monitor apparatus or the administrator sends the fault information to the active arbitration module 200 by using a management client after monitoring the fault information.

In some implementations, the member change module 210 may compare the received fault information with original cluster configuration information, to determine whether the quantity of the faulty nodes is less than half of the quantity of the storage nodes before the fault. In some other implementations, the fault information may carry information indicating whether the quantity of the faulty storage nodes is less than half of the quantity of the storage nodes before the fault. For example, when two AZs are symmetrically deployed, if the received fault information indicates that one AZ becomes faulty, it may be determined that the quantity of the faulty storage nodes is not less than half of the quantity of the storage nodes before the fault, and is exactly half of the quantity of the storage nodes before the fault.

Herein, "configuration degradation" may also be considered as a configuration change. Because a faulty storage node exists in the storage cluster, a total quantity of nodes in the storage cluster decreases. In other words, the cluster configuration decreases. Therefore, such a configuration change is referred to as "configuration degradation" in this application.

The member change module 210 reads the current cluster configuration information from the configuration library 100, and determines whether the configuration degradation conditions are satisfied (S102). If the configuration degradation conditions are not satisfied, error or fault information is returned (S105). If the configuration degradation conditions are satisfied, the configuration degradation is continued. The following two configuration degradation conditions A and B need to be both satisfied for the configuration degradation.

Configuration degradation condition A: The quantity of the faulty storage nodes is half of the quantity of all the storage nodes before the fault, namely, (n+1)/2. Determining whether configuration degradation condition A is satisfied may be combined with step S101. The quantity of the faulty storage nodes may be obtained from the received fault information. The quantity of all the storage nodes before the fault may be obtained from the cluster configuration information read from the configuration library 100.

Configuration degradation condition B: At least one storage node exists in the fault-free storage nodes, and a latest log index number of the storage node is greater than or equal to an index number of a committed log provided, by the storage cluster before the fault, for a user (or a client). In other words, the storage cluster after the fault is still capable of providing a service promised to the user before, and should not reduce a service requirement because of the fault.

A log represents a series of operations performed on a storage node, such as a data operation, a file operation, and a status operation. An order of logs is maintained by using incremental index numbers. The storage node executes the logs in an order of index numbers of the logs, and actual data content can be constructed. "Committed" (committed) is a response of the storage cluster to successful storage of the logs into most storage nodes. A "committed log" is a log that has been successfully stored in most storage nodes. No storage node executes an uncommitted log. Each consistent data replication process is accompanied by at least one new index number of a committed log.

For example, the member change module 210 may obtain an identifier (ID) of each fault-free storage node from the configuration library 100, then construct a network connection to each fault-free storage node (or use an existing network connection), and then obtain a latest log index number of each fault-free storage node.

In some other embodiments, a check of configuration degradation condition B may be alternatively initiated by the member change module 210, independently completed by each storage node, and then fed back to the member change module.

Still referring to FIG. 3, if it is determined that the foregoing configuration degradation conditions are not satisfied, an error/fault information is returned (S105), indicating that the cluster configuration cannot be changed, and the current storage cluster cannot continue to provide a consistent data replication service. If it is determined that the foregoing configuration degradation conditions are satisfied, the cluster configuration information stored in the configuration library 100 is updated (S103).

After the cluster configuration information in the configuration library 100 is updated, the member change module 210 forces the fault-free storage node to perform a cluster configuration change (S104). For example, the member change module 210 delivers a "forced member change" command to all the fault-free storage nodes. The command includes an ID of a storage node that needs to be deleted (which is an ID of a faulty storage node). After receiving the "forced member change" command, the fault-free storage node deletes information about the faulty node from the cluster configuration information included in an internal memory or a hard disk of the fault-free storage node. The "forced member change" may be concurrently performed on all the storage nodes.

It should be noted that, cluster configuration information in an internal memory of the storage leader is used to determine which storage nodes exist in the cluster (and data synchronization progress of the storage nodes). Cluster configuration information in an internal memory of a storage follower is used for the storage follower to possibly become a storage leader subsequently. Cluster configuration information in a hard disk or a disk is used to load the cluster configuration information from the hard disk to an internal memory when the storage node restarts.

After the cluster configuration degradation, if the storage leader in the storage cluster before the fault is not faulty, the storage leader can still be used. The storage cluster continues to provide the consistent data replication service. However, if the cluster configuration changes, a network topology of the storage cluster may change. To improve service performance, the storage leader may be re-elected. The re-elected storage leader may be the same as the original storage leader.

Figure 4:
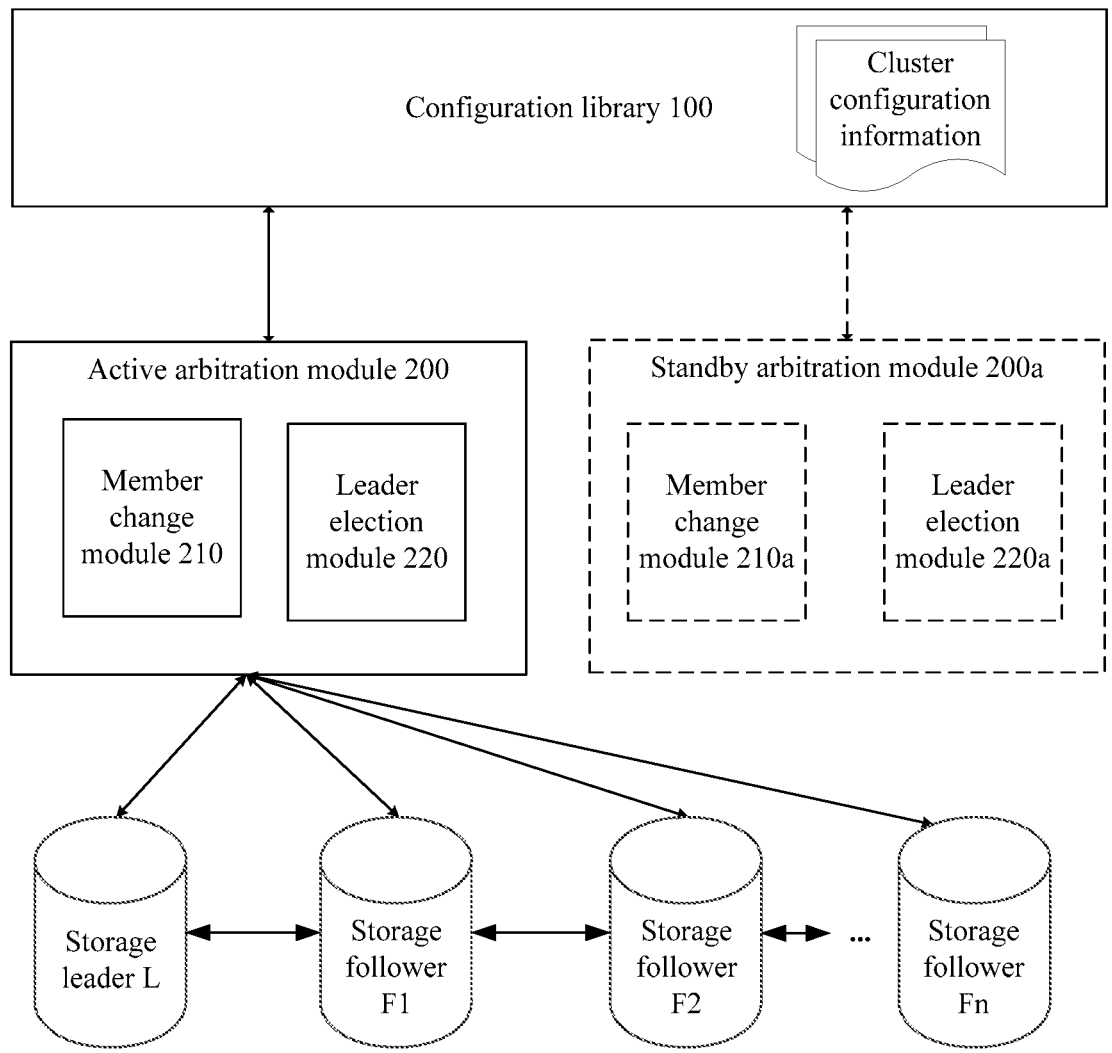
FIG. 4 is a schematic diagram of a logical structure of another storage cluster.
Figure 5:
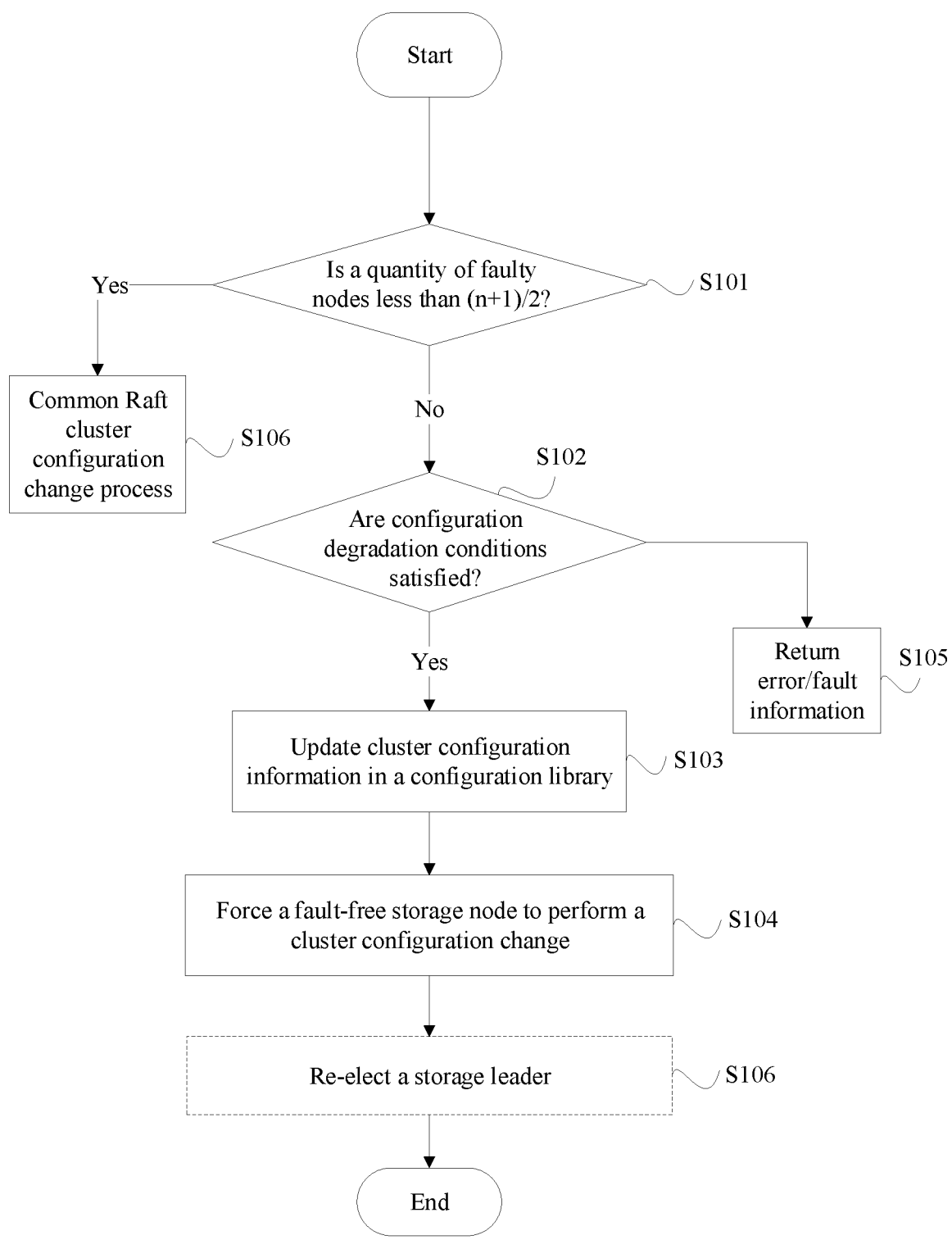
FIG. 5 is a schematic flowchart of another cluster configuration change method.

FIG. 4 is a schematic diagram of a storage cluster according to another embodiment of this application. In addition to components shown in FIG. 2, the arbitration module in the storage cluster further includes leader election modules 220 and 220a. The leader election module is configured to re-elect a storage leader after the cluster configuration changes. FIG. 5 is a schematic flowchart of a storage cluster configuration change method according to this embodiment. Steps S101 to S104 are similar to those in the foregoing embodiment shown in FIG. 3, and reference may be made to the description in the foregoing embodiment. As shown in FIG. 5, after step S104, the leader election module 220 prompts the storage cluster to re-elect a storage leader. There are a plurality of policies for re-electing a storage leader. The policy may be determined according to a requirement of the current storage cluster. A process of re-electing a storage leader also needs to satisfy a requirement of the consensus protocol. Therefore, it is impossible that a storage leader is re-elected only by the leader election module 220. All the fault-free nodes are required to participate. An example of the process of re-electing a leader is described in the following embodiment.

In some other embodiments, after the storage leader is re-elected, a storage follower with outdated data may (but not necessarily) synchronize the log from the new storage leader to obtain a latest data replica.

In some other embodiments, the re-elected storage leader may further send a write request for a cluster configuration change log to all the storage followers under a new cluster configuration. Log content includes a node deleted in the cluster configuration change. When a response that most storage followers accept the write request and have stored the log is received, the log is successfully committed. The log is committed to maintain all operation logs of the storage cluster and store the logs in sequence, so that data and a status of the storage cluster can be restored during an exception restoration (or a restart) process by executing the logs in sequence.

According to the method provided in the foregoing embodiments, when half of nodes become faulty, the storage cluster using the consensus protocol can still provide a data replication service while a service capability is ensured. This is different from the prior art in which the storage cluster is completely incapable of providing the data replication service if half of nodes become faulty. Therefore, availability of the storage cluster is improved.

The foregoing embodiments briefly describe a logical structure of the storage cluster provided in this application and a method procedure performed in the storage cluster. The following embodiment uses a distributed database as an example to describe in detail an embodiment of the technical solutions provided in accordance with the present disclosure. The storage cluster provided in this application is deployed at a storage layer of the distributed database.

Figure 6:
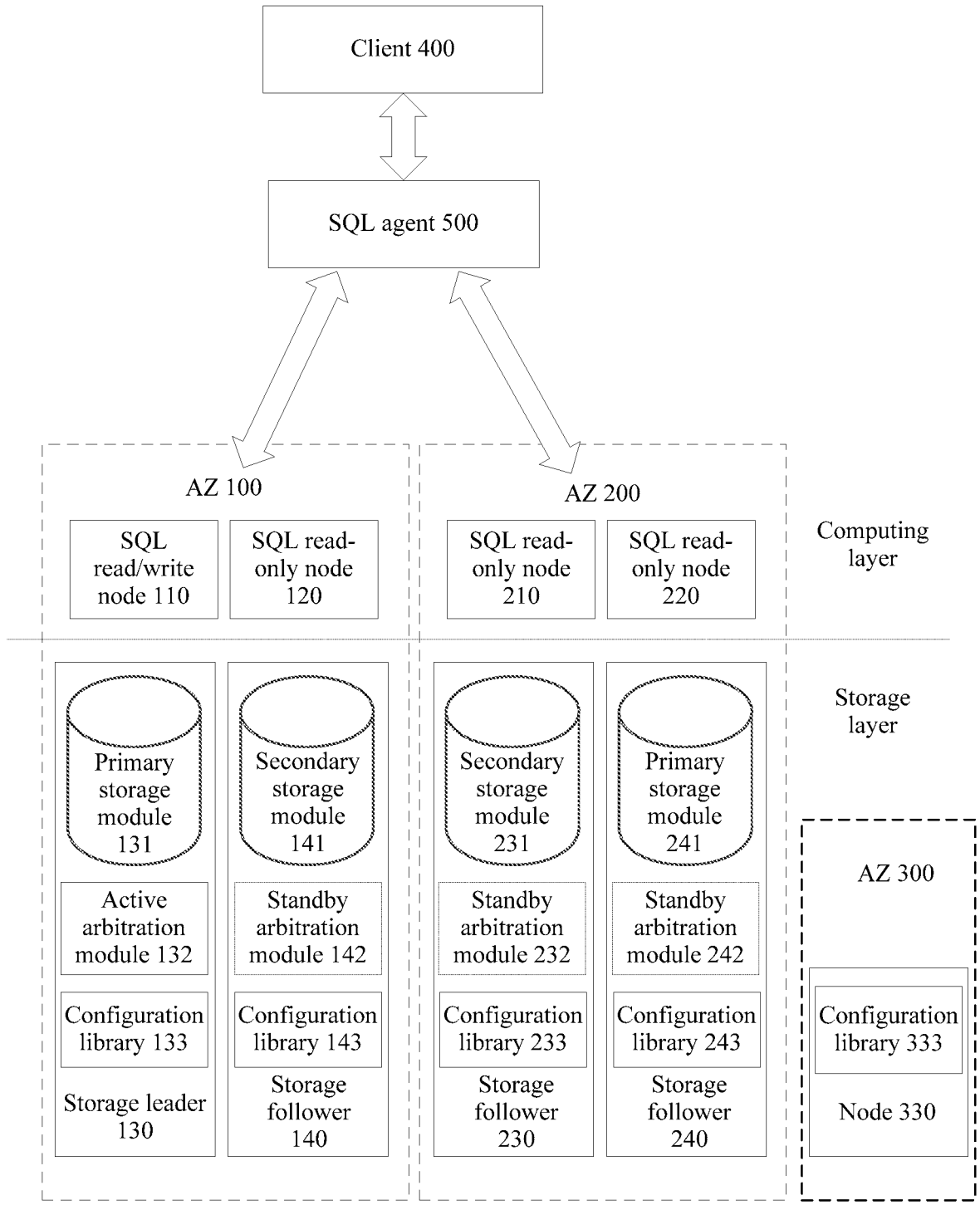
FIG. 6 is a schematic diagram of deployment of a distributed database.

FIG. 6 is a schematic diagram of deployment of a distributed database according to this embodiment. The storage cluster at the storage layer of the distributed database is symmetrically deployed in two AZs (an AZ 100 and an AZ 200). Each AZ includes two storage nodes. There are a total of four storage nodes, including one storage leader 130 and three storage followers 140, 230 and 240. A computing layer of the distributed database includes SQL nodes. The SQL nodes are classified into an SQL reader/writer node 110 and SQL read-only nodes 120, 210, and 220. The SQL reader/writer node 110 and the storage leader 130 are deployed in the same AZ 100. The SQL read-only node 120 is deployed in the AZ 100, and the SQL read-only node 210 and the SQL read-only node 220 are deployed in the AZ 200.

In addition, FIG. 6 further includes a client 400 and an SQL agent 500. The client 400 is a management client that processes management operations performed by a user or an engineer on the distributed database. The cluster configuration change is one of the management operations performed on this database. A client that uses a data service provided by the distributed database may be integrated with the client 400, or may be separately another client. This is not limited in this application.

The SQL agent 500 is configured to receive an SQL request sent by the client 400, and distribute the request to the SQL reader/writer node or one of the SQL read-only nodes at the computing layer based on a type of the SQL request and a load status of each SQL node at the computing layer. Types of the SQL request include a read request and a write request. The SQL reader/writer node is responsible for translating the SQL read request and the SQL write request. The SQL read-only node can translate only the SQL read request. Translation means converting the SQL read request or the SQL write request into a series of actual operations such as a data operation, a file operation, and a status operation on a database. These operations may be represented in a form of logs. The SQL node then sends these logs to a storage node at the storage layer. The storage node is mainly configured to store database data (including a log, a metadata, the data, and the like), execute the log to perform an operation on the data, the metadata, a file, and the like, and return an operation result to the SQL node.

One storage module is deployed in each of the four storage nodes. A primary storage module 131 is deployed in the storage leader 130. Secondary storage modules 141, 231, and 241 are respectively deployed in the storage followers 140, 230, and 240. The storage module herein is a storage module configured to provide a data replication service, and provides a function similar to that of a storage node in the prior art.

In this embodiment, one arbitration module is further deployed in each of the four storage nodes. An active arbitration module 132 is deployed in the storage leader 130. Standby arbitration modules 142, 232, and 242 are respectively deployed in the storage followers 140, 230, and 240. Normally, the three standby arbitration modules do not work. One of the standby arbitration modules takes over work of the original active arbitration module 132 only when the active arbitration module 132 becomes faulty or the storage leader 130 in which the active arbitration module 132 is located becomes faulty. A switchover from the active arbitration module 132 to any standby arbitration module is related to an active/standby switchover. An active/standby switchover method in the prior art may be used. Details are not described herein in this application. The arbitration module may not support storage of persistent cluster configuration information.

In some other embodiments, the arbitration module may be deployed in another node independent of the storage node. Similarly, a configuration library may be deployed in another node.

The cluster configuration information is persistently stored in a distributed configuration library cluster. The configuration library cluster is distributed in three AZs. There are a total of five configuration libraries. As shown in the figure, the five configuration libraries include four configuration libraries 133, 143, 233, and 243 deployed in the storage nodes, and one configuration library 333 deployed in a lightweight AZ 300 to further improve availability of the configuration library. Configuration data stored in the configuration library may not only include the cluster configuration information, but also include status information, network topology information, and the like in a configuration change process.

Each "configuration library" in FIG. 6 may be understood as a running configuration library instance of the distributed configuration library cluster. The distributed configuration library cluster includes a plurality of configuration library instances, but is a unified service to outside (to be specific, to the arbitration module). A configuration library instance accessed by the arbitration module is determined by an interface exposed by the distributed configuration library to the arbitration module, and may be a configuration library instance in a local node, or a configuration library instance in a local AZ, or may be a configuration library instance in another AZ. From the perspective of the arbitration module, there is only one "configuration library". Configuration data is synchronized and replicated between the configuration library instances by using a consensus replication protocol (such as Raft). When one AZ becomes faulty, most (three) configuration library instances still normally work. Therefore, the distributed configuration library cluster can still normally provide a configuration data persistence service and a consistent data replication service.

In some other embodiments, the configuration libraries in the AZ 100 and the AZ 200 may not be deployed inside the storage nodes, but may be deployed inside separate nodes. Different from the storage node that requires storage of a large amount of data, a node in which the configuration library instance is deployed may be a lightweight node with a relatively small storage capacity.

Figure 7:
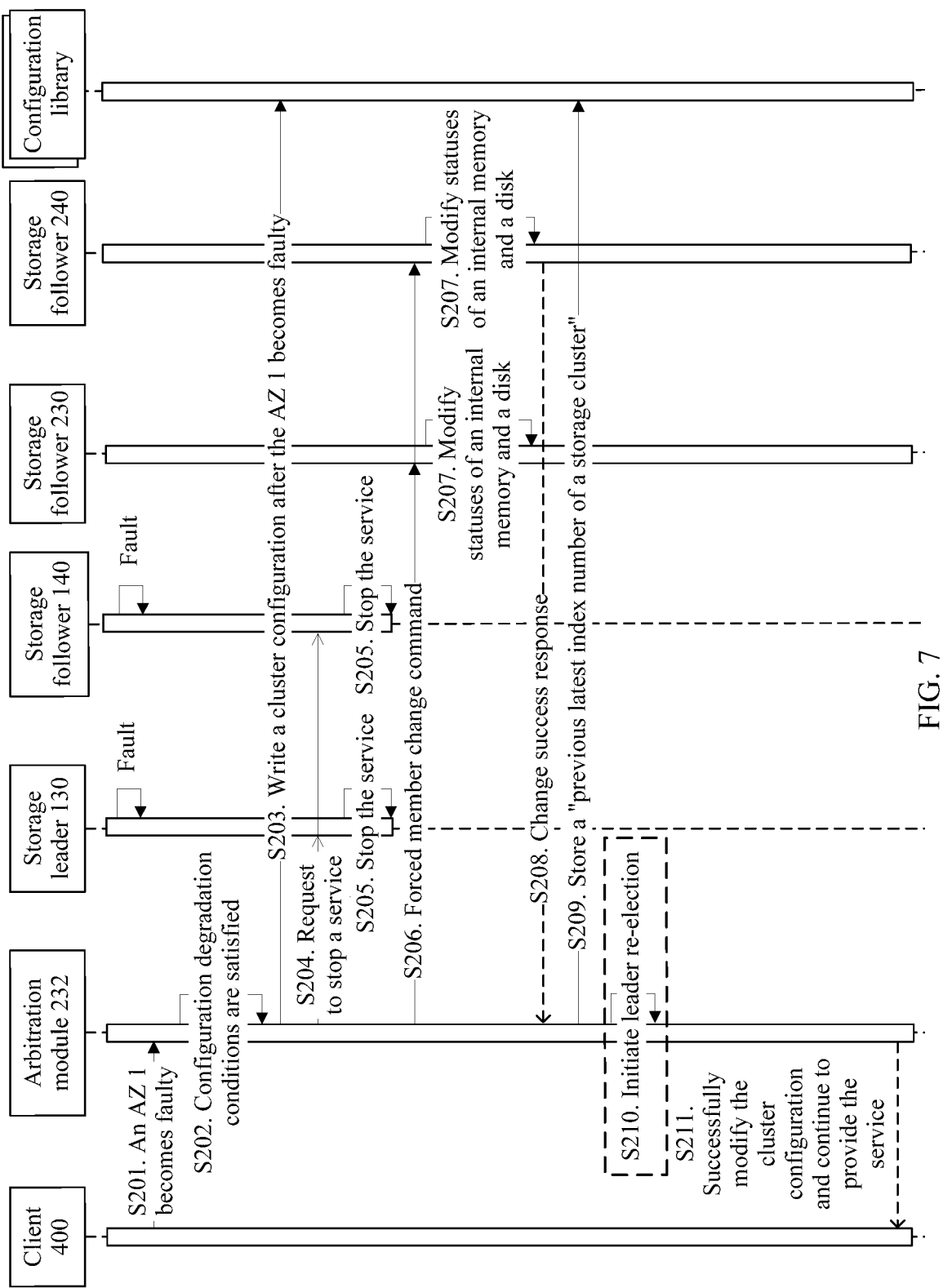
FIG. 7 is a schematic interaction diagram of a cluster configuration change method based on FIG. 6.

In an example of deployment of the distributed database shown in FIG. 6, when an AZ-level fault occurs, that is, all nodes in an entire AZ become faulty, the consistent data replication service can be rapidly restored by using the method provided in this application. A specific process is shown in FIG. 7.

When the AZ-level fault occurs, in this embodiment, assuming that the AZ 100 becomes faulty (both the storage leader 130 and the storage follower 140 become faulty), as described above, the distributed configuration library still normally provides a configuration data reader/writer service. The standby arbitration module 232 or 242 in the fault-free AZ 200 can take over work of the active arbitration module 132 by using the active/standby switchover.

S201: After the client 400 determines that a storage node in the storage cluster or an AZ becomes faulty, the client 400 sends a cluster change message to the arbitration module 232. The cluster change message includes a node ID of the faulty storage node or an identifier of the faulty AZ. In this embodiment, faulty storage nodes are the storage leader 130 and the storage follower 140, and the faulty AZ is the AZ 100.

In some embodiments, the client 400 may obtain a status of the storage cluster monitored by a monitoring apparatus, or serves as a part of a monitoring system and monitors a status of the storage cluster, to obtain a fault information of the storage cluster and determine a storage cluster fault. The fault information may include the ID of the faulty storage node, or may include the identifier of the faulty AZ, or both. In this embodiment, assuming that the fault information includes an identifier of the faulty AZ 100. Then, the client 400 sends the cluster change message to the arbitration module 232. The message carries the faulty AZ 100, to prompt the arbitration module 232 to initiate a cluster configuration change check.

S202: The arbitration module 232 determines whether configuration degradation conditions are satisfied. The configuration degradation conditions are configuration degradation conditions A and B described in the foregoing embodiment.

Example manners of determining whether condition A is satisfied are as follows:

In an implementation, if it is known that the two AZs are symmetrically deployed, if the received fault information carries the faulty AZ 100, it is determined that condition A is satisfied.

In another implementation, storage nodes deployed in the faulty AZ 100 and all storage nodes in the current storage cluster are read from the configuration library, and whether condition A is satisfied is determined based on a quantity of the storage nodes deployed in the faulty AZ 100 and a quantity of all the storage nodes in the current storage cluster.

In another embodiment, if the fault information includes IDs of the faulty storage nodes 130 and 140, all storage nodes in the current storage cluster are read from the configuration library, and whether condition A is satisfied is determined based on a quantity of all the storage nodes in the current storage cluster and a quantity of the faulty storage nodes included in the fault information.

In some embodiments, referring to the foregoing embodiments, it may be first determined whether a quantity of faulty nodes is less than half of a quantity of storage nodes before the fault. If not, it is then determined whether condition A is satisfied. Alternatively, a form of branches may be used: When the quantity of the faulty nodes is less than half of the quantity of the storage nodes before the fault, an original Raft cluster configuration change is performed. When the quantity of the faulty nodes is equal to half of the quantity of the storage nodes before the fault, the cluster configuration change provided in this application is performed. When the quantity of the faulty nodes is greater than half of the quantity of the storage nodes before the fault, a change failure message is returned.

It should be noted that, different content or forms of configuration data stored in the configuration library, or different content or forms of the received fault information may cause a difference in the specific manners of determining whether condition A is satisfied. Specific manners are not listed one by one in this application.

An example manner for determining whether condition B is satisfied is as follows:

The arbitration module 232 reads a "previous latest index number of the storage cluster" in the configuration library (refer to step S209). If this value does not exist, it indicates that the storage cluster has not undergone a forced cluster configuration change, and condition B is satisfied. If this value exists, it indicates that the storage cluster has undergone at least one cluster configuration change. Each fault-free storage node is accessed by using a network connection, and a latest index number of each storage node is read. If a largest index number in the latest index numbers is greater than or equal to the "previous latest index number of the storage cluster", condition B is satisfied. Otherwise, condition B is not satisfied.

Each storage node has a latest index number and a committed index number. The latest index number is an index number of a latest log stored in each node. A committed index number of the storage leader is a largest index number of index numbers of the logs that have been stored into most nodes. The committed index number of the storage leader usually (but not always) represents an index number of a committed log provided by the storage cluster for a client or a user. A committed index number of the storage follower is periodically received from the storage leader, and may slightly lag behind the committed index number of storage leader. In some cases, the committed index number of the storage leader may lag behind the index number of the committed log currently provided by the storage cluster for the client or the user. For example, after half of storage nodes become faulty, the faulty storage nodes include the storage leader, and a new storage leader is elected from the storage followers by using the method in this application. In this case, a committed index number of the storage leader is still a committed index number that is previously used when the new storage leader serves as a storage follower, and may lag behind the index number of the committed log currently provided by the storage cluster for the client or the user.

Figure 8:
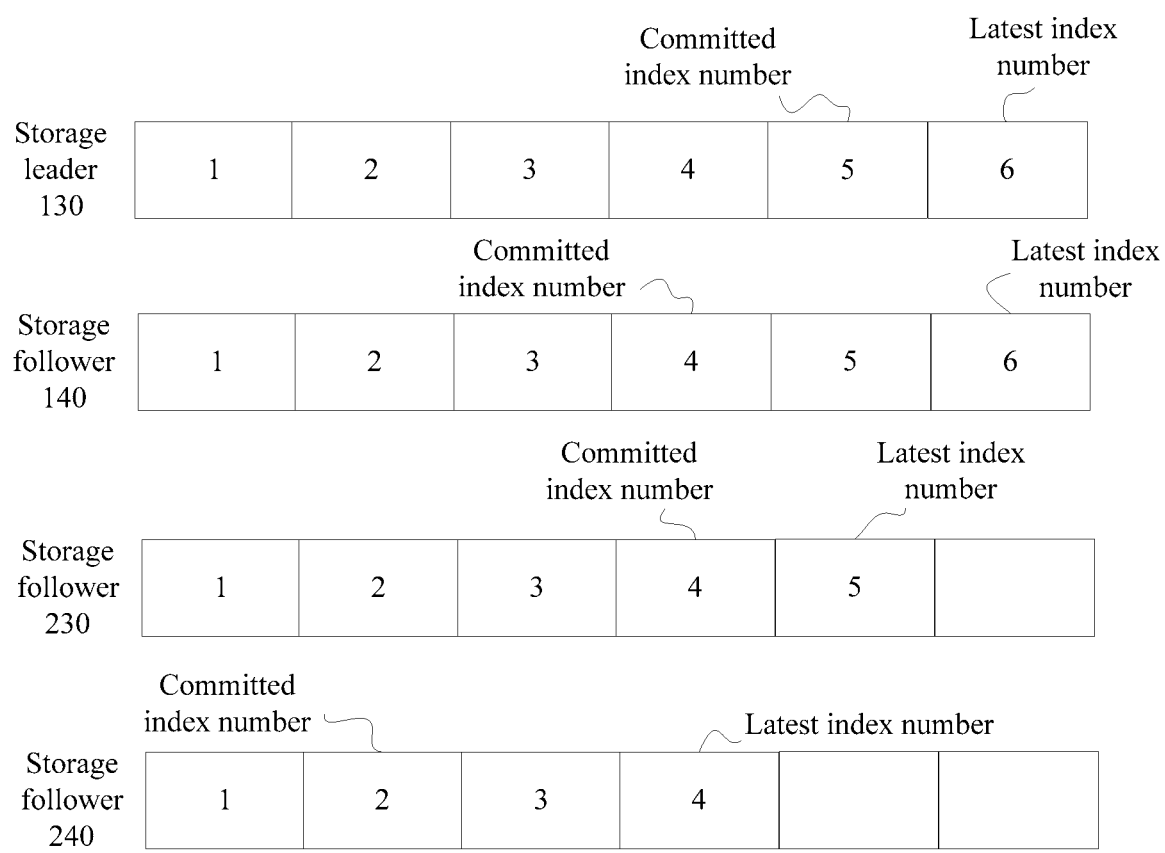
FIG. 8 is an example of index numbers of a log stored in a storage node.

FIG. 8 shows statuses of index numbers of the current four storage nodes in this embodiment. As shown in FIG. 8, a log corresponding to an index number 5 of the storage leader has been stored into three storage nodes (131, 141, and 231), which account for a majority. Therefore, a committed index number of the storage leader is 5. Committed index numbers of the three storage followers 140, 230, and 240 lag behind the committed index number of the storage leader, and are 4, 4, and 2 respectively. In the storage cluster, latest log index numbers of most nodes are greater than or equal to a committed index number of the storage cluster. It is assumed that a service promised by the storage cluster to the user or the client 400 before the fault needs to reach a service provided by a log whose index number is 5, and fault-free nodes after the fault are the storage followers 230 and 240, with a latest index number of the storage follower 230 being 5. Therefore, condition B is satisfied.

In some embodiments, assuming that the fault in this embodiment is the first fault, the "previous latest index number of the storage cluster" is empty, and it is determined that condition B is satisfied. It is easy to understand that, for the storage cluster that uses the consensus protocol, because most storage nodes store the committed index number of the storage leader, at least one storage node exists after half of the storage nodes become faulty for the first time. A latest index number of the storage node is greater than or equal to the committed index number of the storage leader. The committed index number of the storage leader before the first fault represents the index number of the committed log provided by the storage cluster for the client or the user, and may also be understood as one aspect of data service quality promised by the storage cluster to the client or the user.

S203: After it is determined that the configuration degradation conditions are satisfied, the arbitration module 232 writes new configuration information of the storage cluster after the fault into the configuration library. The new configuration information may include an ID of each node surviving the fault.

A format of the "configuration information" is not specifically limited in this application. How to change the configuration information after the fault may be determined based on an actual status. In some implementations, the configuration information of the storage cluster includes information about each storage node, and the format is roughly as follows: "a cluster ID, an AZ ID, a computer name, and an ID of a storage node (or an SQL node)". Therefore, the arbitration module 232 writes (updates) the new configuration information of the storage cluster after the fault into the configuration library. Actually, information about the corresponding faulty storage node is deleted, and the new cluster configuration information is generated. For example, the previously received fault information indicates that an AZ becomes faulty; information about all storage nodes corresponding to the AZ is deleted from the configuration library. For another example, if the previously received fault information indicates that a plurality of storage nodes become faulty, the fault information may include storage node information, "a cluster ID, an AZ ID, a computer name, and an ID of a storage node". Information about the corresponding storage nodes may be deleted from the configuration library.

S204: The arbitration module 232 sends an asynchronous request to the faulty storage nodes 130 and 140 to require that the storage nodes 130 and 140 stop services. The asynchronous request may be received by the faulty nodes, or may not be received by the faulty nodes. Steps S204 and S205 are optional in some other embodiments.

S205: The storage nodes 130 and 140 stop the services.

S206: The arbitration module 232 sends a "forced member change" command to the fault-free storage nodes (the storage followers 230 and 240). The command is used to instruct the fault-free storage nodes to delete information about the faulty storage nodes (the storage node 130 and the storage node 140) from an internal memory and a hard disk. In this embodiment, the arbitration module 232 is deployed in the storage follower 230. Therefore, the forced member change command is actually sent to the storage module 231.

S207: The fault-free storage followers 230 and 240 change cluster configuration information stored in their internal memory and hard disk, stop receiving a message from the faulty storage nodes, and stop sending a message to the faulty storage nodes.

S208: The fault-free storage followers 230 and 240 return a "change success" response to the arbitration module 232. The response includes latest index numbers of their respective logs, namely, an index number 5 and an index number 4 in FIG. 8. The arbitration module 232 is deployed in the storage follower 230. Therefore, for the storage follower 230, the secondary storage module 231 returns the response to the arbitration module 232.

It should be noted that a latest index number in the "change success" response is consistent with a latest index number obtained during the previous check of the configuration degradation conditions. Therefore, if the arbitration module 232 previously stores the previously obtained latest index number, the response herein does not need to include the latest index number.

S209: When the arbitration module 232 obtains the "change success" response from all the fault-free storage nodes, the arbitration module 232 stores a largest latest index number (the index number 5) in all the responses into the distributed configuration library, and marks the largest latest index number as "previous latest index number of the storage cluster". The cluster configuration change of the storage cluster is complete.

Assuming that a fault occurs again after step S209, if the faulty storage node is the storage follower 230, the arbitration module 232 determines that a latest index number 4 of the fault-free storage node 240 is less than the "previous latest index number of the storage cluster", which is 5. Therefore, condition B is not satisfied (definitely, condition A is satisfied), the configuration degradation cannot be performed again, and the storage cluster stops providing a service. If the faulty storage node is the storage follower 240, the arbitration module 232 determines that a latest index number 5 of the fault-free storage node 230 is equal to the "previous latest index number of the storage cluster", which is 5. Therefore, condition B is satisfied, the forced cluster configuration change is performed again, and the storage cluster can still provide the service.

S210: The arbitration module 232 initiates re-election of the storage leader under a new cluster configuration. This step is described in detail in the following.

The re-elected storage leader may request the storage cluster to commit a storage cluster configuration change log according to the Raft protocol. The log may include IDs of nodes, namely, the storage nodes 130 and 140, deleted in the cluster configuration change.

S211: The arbitration module 232 responds to the client. The cluster configuration change succeeds, and a system restores a service.

Further, the arbitration module 232 initiates re-election of the storage leader.

Figure 9:
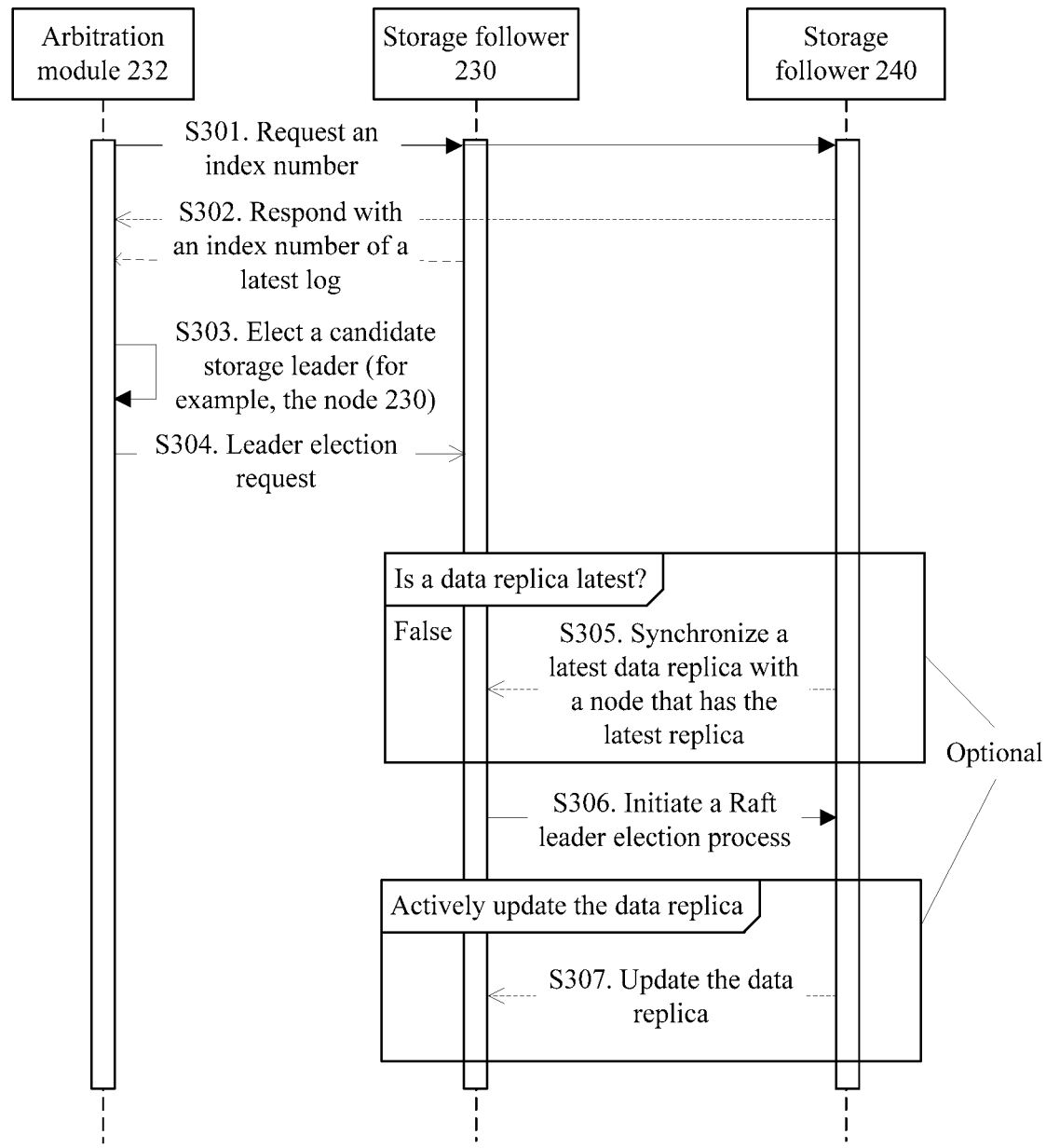
FIG. 9 is a schematic interaction diagram of re-electing a storage leader based on FIG. 6 and FIG. 7.

FIG. 9 is a process of re-electing a storage leader.

S301: An arbitration module 232 sends a request message to fault-free storage nodes, to obtain latest index numbers of the fault-free storage followers 230 and 240.

S302: The storage followers 230 and 240 return the latest index numbers, namely, the index numbers 5 and 4 in FIG. 8, to the arbitration module 232.

S303: The arbitration module 232 elects a storage node whose latest log index number is the largest as a candidate storage leader, namely, the storage follower 230.

S304: The arbitration module 232 sends a leader election request to the candidate storage leader 230, where the request includes whether a data replica (namely, a log) of the candidate storage leader is the latest, and an ID of a node having a latest data replica when the data replica is not the latest. In this embodiment, because the storage follower 230 whose index number is the largest is elected in the previous step, the data replica (namely, the log) that is of the candidate storage leader and that is included in the request is the latest.

S305: After receiving the leader election request, the storage follower 230 determines whether its data replica (namely, a log) is the latest. If its data replica is not the latest, the storage follower 230 obtains a data replica from anode having the latest data replica, and updates the data replica of the storage follower 230 to the latest data replica. In this embodiment, the data replica stored in the storage follower 230 is the latest.

S306: The storage follower 230 initiates, based on the current cluster configuration (a changed cluster configuration after the fault) in a leader election manner of the Raft protocol, an election that requires active responses of most nodes. This is the prior art, and details are not described in this application.

S307: After a new storage leader (which may be or may not be the storage follower 230) is determined through election, another storage follower may actively update a data replica, and specifically, update the data replica to the latest data replica by synchronizing a data log with the new storage leader. The storage follower may not actively update the data replica. The data replica of the storage follower is automatically updated in a next data replication according to a requirement of the Raft protocol.

Because the AZ 100 becomes faulty, an only SQL reader/writer node 110 is also unavailable. A distributed database needs to re-designate one of SQL read-only nodes 210 and 220 as an SQL reader/writer node. In this embodiment, a new SQL reader/writer node may be selected by the client 400 arbitrarily or by using a specific programming algorithm (or randomly, or by selecting an optimal node based on predicted machine performance). An SQL agent 500 may be notified of an SQL node change in a plurality of manners. In one manner, the SQL agent 500 monitors an event about a change of the SQL reader/writer node in the configuration library, to know the change of the SQL reader/writer node (in a resolved solution). In another manner, the SQL agent 500 periodically detects each SQL node. Alternatively, the arbitration module 232 may notify the SQL agent 500 of appearance of the new SQL reader/writer node. The manners are not listed one by one in this application.

Figure 10:
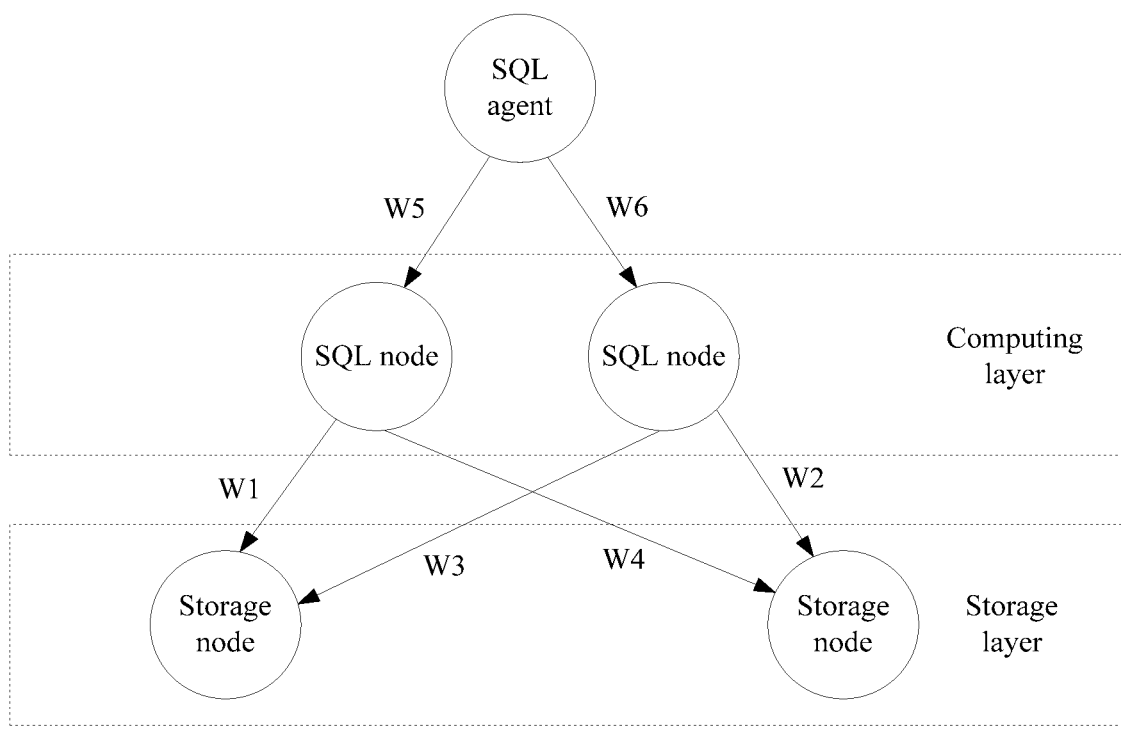
FIG. 10 is an example of a directed weighted graph used for electing a candidate storage leader.

In another embodiment, in step S303, the method for electing a candidate storage leader may be alternatively replaced with the following algorithm:

The arbitration module 232 reads network topology data between a computing layer and a storage layer of an entire system from the configuration library, and creates a directed weighted acyclic graph based on the network topology data. As shown in FIG. 10, each circle may represent a node. Then, a shortest path in the graph is calculated. A weight (from W1 to W6) of an edge in the graph may be determined based on a network communication rate and load between nodes, and may be dynamically adjusted based on a feedback of communication during a system running process. Dijkstra's algorithm may be used to calculate the shortest path. A calculation result includes, for example, an ID of a next-hop node and mapping between an IP address and a port of the node. A storage node on the calculated shortest path is the candidate storage leader. The arbitration module 232 communicates with the storage node based on the mapping between the IP address and the port, and a next step is continued. In addition, an SQL node on the shortest path is determined as the SQL reader/writer node. Another SQL node may be an SQL reader node.

It should be noted that an SQL node at the computing layer and a storage node at the storage layer may periodically send their topology information to the configuration library, so that the configuration library always stores network topology data of the entire system.

In the prior art, no solution is provided for how to optimize network performance of a storage node and a computing layer under a new cluster configuration after a member of the storage cluster is changed. In the leader election process, the SQL reader/writer node and the storage leader are re-elected (according to a latest rule of a data replica or an optimal leader election algorithm), to rapidly restore communications of the computing layer and the storage layer under the new cluster configuration. In the optimal main algorithm, dynamic weight adjustment is performed on a topology network of nodes between the computing layer and the storage layer based on the network communication rate and the load, and the shortest path is calculated, to optimize read/write performance of the computing layer and the storage layer.

The cluster configuration change method provided in this application may be applied to a storage layer of a distributed database, and may be applied to another storage cluster that uses a consensus replication protocol, such as a distributed key-value system, a distributed lock, or a distributed file system.

It should be noted that division of modules or units proposed in the foregoing embodiments is merely an example for illustration, and functions of the described modules are merely used as examples for description, and this application is not limited thereto. Persons of ordinary skill in the art may combine functions of two or more modules, or split a function of a module to obtain more modules of a finer granularity and other variants according to a requirement.

For same or similar parts in the foregoing embodiments, mutual reference may be made.

The described apparatus embodiments are merely examples. The modules described as separate parts may or may not be physically separate, and parts displayed as modules may or may not be physical modules, may be in one location, or may be distributed on a plurality of network modules. Some or all of the modules may be selected based on an actual requirement to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. Persons of ordinary skill in the art may understand and implement the embodiments without creative efforts.

The foregoing descriptions are merely some specific implementations of this application, but are not intended to limit the protection scope of this application.

What is claimed is:

1. A storage cluster configuration change method, wherein a storage cluster comprises a plurality of storage nodes and a configuration library, and the method comprises:
    after a fault occurs in the storage cluster, changing cluster configuration information stored in the configuration library and sending a forced cluster configuration change instruction to a fault-free storage node when conditions A and B are satisfied, wherein the forced cluster configuration change instruction is configured to instruct the fault-free storage node to change local cluster configuration information, and
    condition A indicates a quantity of faulty storage nodes is half of a quantity of all storage nodes in the storage cluster before the fault occurs; and condition B indicates at least one storage node exists in the storage cluster after the fault, and a latest log index number of the storage node is greater than or equal to an index number of a committed log provided by the storage cluster for a client, wherein the configuration library stores configuration data of the storage cluster, and the configuration data comprises the cluster configuration information, the cluster configuration information comprising information about all fault-free storage nodes in the storage cluster.

2. The method according to claim 1, further comprising: after the fault occurs in the storage cluster and a forced cluster configuration change is performed, re-electing a candidate storage leader from the fault-free storage nodes, and sending a leader election request to the candidate storage leader, wherein the leader election request is used to instruct the candidate storage leader to initiate a leader election process.

3. The method according to claim 2, wherein:
the re-electing a candidate storage leader from the fault-free storage nodes comprises:
electing a storage node whose latest log index number is the largest in all the fault-free storage nodes as the candidate storage leader.

4. The method according to claim 2, wherein the configuration data further comprises network topology information of a network on which the storage cluster is deployed; and
the re-electing a candidate storage leader from the fault-free storage nodes comprises:
obtaining the network topology information and constructing a directed weighted graph from a client node or an agent node to each of the fault-free storage nodes based on the network topology information, wherein a weight of an edge between nodes is determined by a network communication rate or load between the nodes; and calculating a shortest path in the directed weighted graph, and determining that a storage node located on the shortest path is the candidate storage leader.

5. The method according to claim 1, further comprising: sending a write request for a cluster configuration change log to a storage follower in the storage cluster, wherein the cluster configuration change log comprises information about a faulty storage node in the cluster configuration change, and the re-elected storage leader is a storage leader elected by the storage cluster based on the leader election request.

6. The method according claim 1, further comprising: obtain latest log index numbers of all the fault-free storage nodes after the fault, and determine that condition B is satisfied if a largest value of the latest log index numbers of all the fault-free storage nodes after the fault is greater than or equal to a largest value of latest log index numbers of all the fault-free storage nodes after the previous fault.

7. The method according claim 1, further comprising: determine that condition B is satisfied if the fault is the first fault of the cluster.

8. The method according claim 1, further comprising: obtain latest log index numbers of all the fault-free storage nodes after the fault, and determine that condition B is satisfied if a largest value of the latest log index numbers of all the fault-free storage nodes after the fault is greater than or equal to a largest value of latest log index numbers of all the fault-free storage nodes after the previous fault; and determine that condition B is satisfied if the fault is the first fault of the cluster.

9. A computer system, comprising a processor and a memory, wherein the memory is configured to store a computer instruction, and the processor is configured to read the computer instruction and implement a storage cluster configuration change method, wherein a storage cluster comprises a plurality of storage nodes and a configuration library, and the method comprises:
after a fault occurs in the storage cluster, changing cluster configuration information stored in the configuration library and sending a forced cluster configuration change instruction to a fault-free storage node when conditions A and B are satisfied, wherein the forced cluster configuration change instruction is configured to instruct the fault-free storage node to change local cluster configuration information:
condition A specifies a quantity of faulty storage nodes is half of a quantity of all storage nodes in the storage cluster before the fault occurs; and
condition B specifies at least one storage node exists in the storage cluster after the fault, and a latest log index number of the storage node is greater than or equal to an index number of a committed log provided by the storage cluster for a client, wherein
the configuration library stores configuration data of the storage cluster, and the configuration data comprises the cluster configuration information, the cluster configuration information comprising information about all fault-free storage nodes in the storage cluster.

10. The computer system according to claim 9, the method further comprising:
after the fault occurs in the storage cluster and a forced cluster configuration change is performed, re-electing a candidate storage leader from the fault-free storage nodes, and sending a leader election request to the candidate storage leader, wherein the leader election request is configured to instruct the candidate storage leader to initiate a leader election process.

11. The computer system according to claim 10, wherein:
the re-electing a candidate storage leader from the fault-free storage nodes comprises:
electing a storage node whose latest log index number is the largest in all the fault-free storage nodes as the candidate storage leader.

12. The computer system according to claim 10, wherein the configuration data further comprises network topology information of a network on which the storage cluster is deployed; and
the re-electing a candidate storage leader from the fault-free storage nodes comprises:
obtaining the network topology information and constructing a directed weighted graph from a client node or an agent node to each of the fault-free storage nodes based on the network topology information, wherein a weight of an edge between nodes is determined by a network communication rate or load between the nodes; and calculating a shortest path in the directed weighted graph, and determining that a storage node located on the shortest path is the candidate storage leader.

13. The computer system according to claim 9, wherein the method further comprising:
sending a write request for a cluster configuration change log to a storage follower in the storage cluster, wherein the cluster configuration change log comprises information about a faulty storage node in the cluster configuration change, and the re-elected storage leader is a storage leader elected by the storage cluster based on the leader election request.

14. The method according claim 9, further comprising: obtain latest log index numbers of all the fault-free storage nodes after the fault, and determine that condition B is satisfied if a largest value of the latest log index numbers of all the fault-free storage nodes after the fault is greater than or equal to a largest value of latest log index numbers of all the fault-free storage nodes after the previous fault.

15. The method according claim 9, further comprising: determine that condition B is satisfied if the fault is the first fault of the cluster.

16. A non-transitory computer-readable medium, wherein the computer readable storage medium comprises a computer readable instruction, and when the computer readable instruction is read and executed by a processor, a method for configuration change of a storage cluster, wherein a storage cluster comprises a plurality of storage nodes and a configuration library, and the method comprises:
   after a fault occurs in the storage cluster, changing cluster configuration information stored in the configuration library and sending a forced cluster configuration change instruction to a fault-free storage node when conditions A and B are satisfied, wherein the forced cluster configuration change instruction is configured to instruct the fault-free storage node to change local cluster configuration information, and
   condition A indicates a quantity of faulty storage nodes is half of a quantity of all storage nodes in the storage cluster before the fault occurs; and
   condition B indicates at least one storage node exists in the storage cluster after the fault, and a latest log index number of the storage node is greater than or equal to an index number of a committed log provided by the storage cluster for a client, wherein
   the configuration library stores configuration data of the storage cluster, and the configuration data comprises the cluster configuration information, the cluster configuration information comprising information about all fault-free storage nodes in the storage cluster.

17. The non-transitory computer-readable medium according to claim 16, the method further comprises:
   after the fault occurs in the storage cluster and a forced cluster configuration change is performed, re-electing a candidate storage leader from the fault-free storage nodes, and sending a leader election request to the candidate storage leader, wherein the leader election request is configured to instruct the candidate storage leader to initiate a leader election process.

18. The non-transitory computer-readable medium according to claim 17, the re-electing a candidate storage leader from the fault-free storage nodes comprises:
   electing a storage node whose latest log index number is the largest in all the fault-free storage nodes as the candidate storage leader.

19. The non-transitory computer-readable medium according to claim 17, wherein the configuration data further comprises network topology information of a network on which the storage cluster is deployed; and, wherein
   re-electing the candidate storage leader from the fault-free storage nodes comprises:
   obtaining the network topology information and constructing a directed weighted graph from a client node or an agent node to each of the fault-free storage nodes based on the network topology information, wherein a weight of an edge between nodes is determined by a network communication rate or load between the nodes; and
   calculating a shortest path in the directed weighted graph, and determining that a storage node located on the shortest path is the candidate storage leader.

20. The non-transitory computer-readable medium according to claim 16, the method further comprises:
   sending a write request for a cluster configuration change log to a storage follower in the storage cluster, wherein the cluster configuration change log comprises information about a faulty storage node in the cluster configuration change, and the re-elected storage leader is a storage leader elected by the storage cluster based on the leader election request.

* * * * *

UNITED STATES PATENT AND TRADEMARK OFFICE
CERTIFICATE OF CORRECTION

PATENT NO. : 11,360,854 B2
APPLICATION NO. : 16/862591
DATED : June 14, 2022
INVENTOR(S) : Siyi Zhou et al.

It is certified that error appears in the above-identified patent and that said Letters Patent is hereby corrected as shown below:

In the Claims

In Column 19, Line 49, in Claim 6, after "according" insert -- to --.

In Column 19, Line 57, in Claim 7, after "according" insert -- to --.

In Column 19, Line 60, in Claim 8, after "according" insert -- to --.

In Column 21, Line 4, in Claim 14, after "according" insert -- to --.

In Column 21, Line 12, in Claim 15, after "according" insert -- to --.

Signed and Sealed this
Ninth Day of August, 2022

Katherine Kelly Vidal
*Director of the United States Patent and Trademark Office*